United States Patent [19]

Herlein

[11] 4,165,092
[45] Aug. 21, 1979

[54] BRACKET FOR REMOVABLY MOUNTING A MUD FLAP ASSEMBLY

[75] Inventor: Daniel K. Herlein, Muskegon, Mich.

[73] Assignee: Fleet Engineers, Inc., Muskegon Heights, Mich.

[21] Appl. No.: 876,033

[22] Filed: Feb. 8, 1978

[51] Int. Cl.² .................. B62B 9/16; B62D 25/16
[52] U.S. Cl. .................. 280/154.5 R; 248/222.1
[58] Field of Search .............. 280/154.5 R, 154.5 A; 248/222.1, 225.1

[56] References Cited

U.S. PATENT DOCUMENTS

| | | | |
|---|---|---|---|
| 2,652,266 | 9/1953 | Miller | 280/154.5 |
| 3,420,480 | 1/1969 | Matson | 248/222.1 |

Primary Examiner—Albert J. Makay
Assistant Examiner—Edmond G. Rishell, Jr.
Attorney, Agent, or Firm—McGarry & Waters

[57] ABSTRACT

A mud flap mounting bracket mounts the mud flap assembly onto a truck frame. A mud flap assembly has a seat member, a face plate rotatably seated against the seat member and an arm attached to one end thereof to the face plate. A tension spring has one end connected to the arm and another end connected to a chain which is in turn attached to the seat member through a U-bolt for retaining the face plate seated against the seat member. The seat member has attached at an opposite face a bight section of a first U-shaped bracket. A second U-shaped bracket has its bight section fixably mounted to the frame of the vehicle. Each U-shaped bracket has legs extending outwardly from its bight section. The first U-shaped bracket has a rod rigidly connected to and extending between the leg portions. The leg portions of the second bracket has slots downwardly extending from the side edge of the leg portions. The rod member and slots are sized so that the rod snugly fits within the slot. The legs of each bracket are spaced apart so that the legs of the first bracket abut the legs of the second bracket when the rod is engaged in the slots. Each leg has an aperture therethrough. The apertures are positioned to align with each other for receiving a lock pin when the rod is engaged within the slots.

7 Claims, 10 Drawing Figures

BRACKET FOR REMOVABLY MOUNTING A MUD FLAP ASSEMBLY

BACKGROUND OF THE INVENTION

1. Field of the Invention

This invention relates to a mud flap mounting device and more particularly a mud flap mounting device which provides for easy mounting and removing of a mud flap to a vehicle frame.

2. Description of the Prior Art

Mud guards or mud flaps are used primarily behind dual rear wheel truck and trailer vehicles. Because the trucks may go at great speeds and some heavy mud may be thrown up against the mud flap at a great force, the mud flap must have the ability to flex in the forward and rearward directions, as well as in the vertical direction. The lack of the ability to flex results in the tearing or ripping of the mud flap or breaking of the supports which mount the flap to the frame. Some mud flaps have been adapted so that the mounting structure comprises a single piece of springlike bar stock bent in a shape for spring and mud guards and for flexing in all directions. For an example, see Betts, U.S. Pat. No. 2,970,849 issued on Feb. 7, 1961, and Juergens, U.S. Pat. No. 3,782,757 issued Jan. 1, 1975.

Other mounting assemblies for mud flaps use a rigid hanger assembly and resiliently bias the hanger assembly to a seat which is attached to the frame of a vehicle. For an example, see Prohl et al, U.S. Pat. No. 3,401,953 issued on Sept. 17, 1968, and Juergens, U.S. Pat. No. 3,954,281 issued on May 4, 1976.

Even with the spring and resiliently biased, mud flaps often need to be replaced. To efficiently and easily replace the mud flap, it is desirable that the whole mud flap assembly be removed from the frame so that the old mud flap can be removed from the arm and a new mud flap replaced onto the arm free from the dirts, cold, and dangers of replacing the mud flap on the arm while the arm is attached to the frame underneath the truck body. Quick removal is also desirable if the flap assembly is to be moved from one frame location to another. Many bracket mounts have been devised to ease the ability of the removal of the mud flap assembly. Many mud flap mounts consist of a tubular guideway attached to the frame and the arm has a downwardly bent portion which snap fits into the guideway. For an example, see Hammerly, U.S. Pat. No. 3,934,901 issued on Jan. 27, 1976, and Jossy, U.S. Pat. No. 3,632,137 issued on Jan. 4, 1972.

However, for mud flap assemblies which have a resiliently biased face plate abutting a seat, there is no satisfactory bracket mount which removably mounts the seat assembly to the frame. The seat is merely bolted onto the frame. Removal of the hanger assembly requires either that the nuts be unfastened which could be a tedius job because the threaded bolts may have been rusted over or be coated with sludge and dirt. Another way to remove the mud flap assembly is to unseat the face plate from the seat which requires that the tension spring seating the face plate into the seat be released therefrom. The release of the spring could be troublesome and dangerous and also cause difficulty in remounting.

SUMMARY OF THE INVENTION

According to the invention, a mud flap mounting bracket mounts the mud flap assembly onto a motor vehicle frame. The mud flap assembly has a seat member, a face plate rotatably seated against the seat member, an arm attached at one end thereof to the face plate and extending outwardly therefrom and a resilient tensioning means retains the face seated against the seat member. The mud flap extends down along the arm. The bracket mount has a first bracket fixedly mounted to the frame of the vehicle and a second bracket fixedly mounted to the seat member of the mud flap assembly. The first and second bracket are adapted to be hitched together so that the arm extends horizontally outward from the vehicle frame.

Preferably, the brackets are U-shaped. Each U-shaped bracket has a bight section and two outwardly extending flange sections. One bracket has a projection extending from its flange section and the other bracket preferably has a slot defined in its flange section in which the projection may be received. A retaining means retains the projection means within the slot so that the bracket members remain coupled together.

Preferably, the projection is a rod connected between the two flange sections of the U-shaped bracket. Preferably, the slots extend inwardly and downwardly from the side edge of the flange section of the other U-shaped bracket. The retaining means comprises a lip defined in the flange section between a downwardly extending inner end of the slot and the side edge of the flange section. Preferably, the flange sections are substantially parallel and are substantially planar. The flange sections are spaced apart such that when the projection engages the slots, the flange sections of one bracket member abuts the flange sections of the other member along facing surfaces thereof.

Each flange section has an aperture therethrough and the apertures are positioned so that the apertures through the flange sections of the first bracket member are aligned with apertures through the abutting flange sections of the second bracket member when the projection engages each slot. A lock pin is positioned through the apertures to lock the bracket members in a coupled position.

Preferably, the bight section of the second bracket member is a substantially flat plate. The plate has apertures therethrough which receives the fastener connected to the tensioning means in the arm. The fastener extends through apertures in the seat and the plate to secure the plate against seat member.

Desirably, the first bracket also has a planar bight section which is bolted onto the frame of the vehicle. The second bracket is coupled to the first bracket by sliding the rod of the second bracket into the slots of the first bracket to the inner end of the slots. A lock pin is then positioned through the then aligned apertures through the flange sections to lock the brackets in a coupled and fixed position.

For removal, the pin is merely removed from the apertures and the second bracket is disengaged from the first bracket. The second bracket need not be removed from the seat nor must the tensioning means connecting the arm to the seat be released since the face plate can remain seated within the seat when the mud flap assembly is removed from the vehicle frame.

DESCRIPTION OF THE DRAWINGS

The invention will now be described with reference to the accompanying drawings in which.

DESCRIPTION OF THE PREFERRED EMBODIMENT

Figure 1:
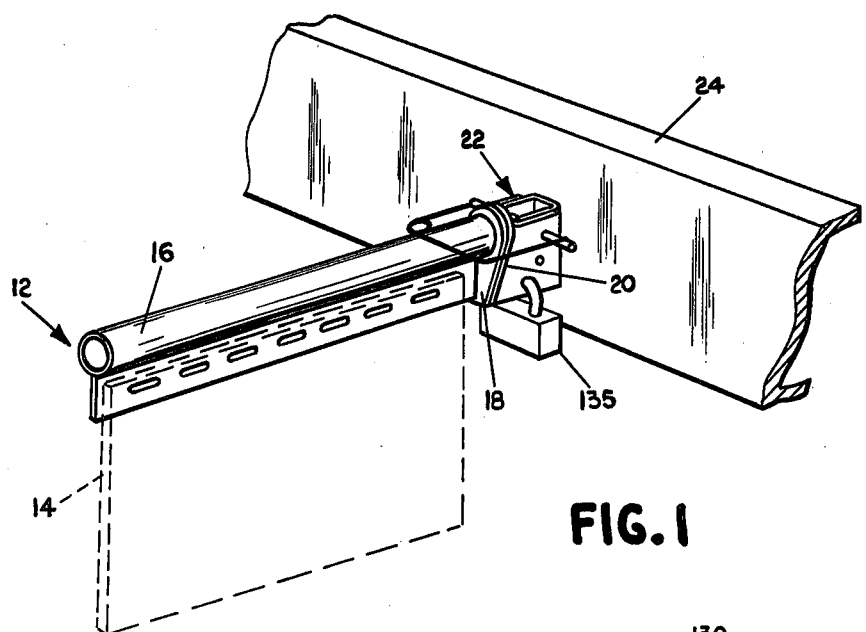
FIG. 1 is a perspective view of the mud flap assembly mounted by an embodiment of the invention.
Figure 2:
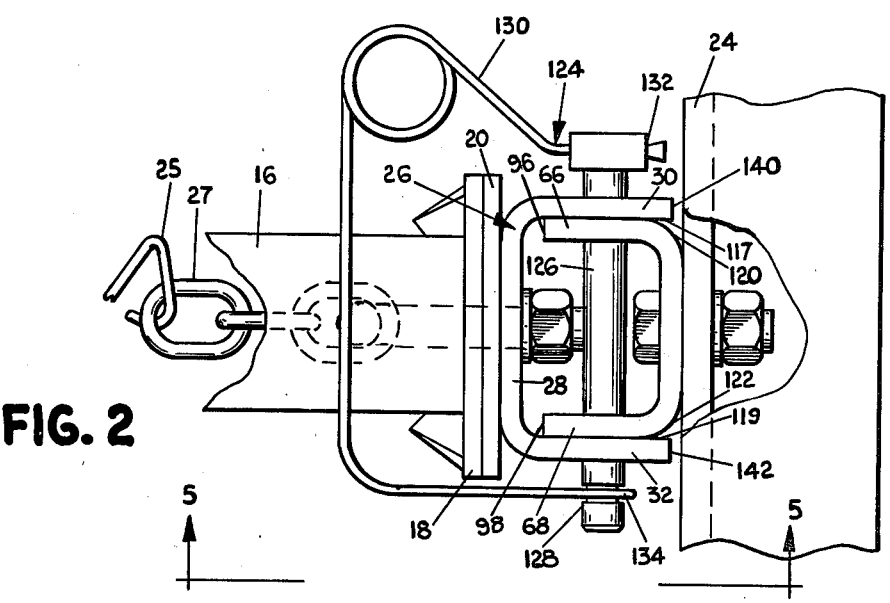
FIG. 2 is a top plan view of the mounting bracket shown in FIG. 1.

Referring now to the drawings, particularly FIG. 1, a mud flap assembly includes a mud flap 14 attached along the length of a tubular arm 16. The arm is attached at an inner end to a face plate 18 which abuts a seating member 20. As shown in FIG. 2, within the tubular arm 16 is a tension spring 25 which has one end connected to the arm 16 and another end secured to a chain 27 which, in turn, is connected to the seat member 20 such that the arm and face plate 18 rotatably pivot against the seat 20 and always returns to a seated position with seat 20.

The mud flap assembly 12 is attached to a bracket mount 22 which, in turn, is secured to the frame 24 of the truck (not shown) such that the mud flap 14 extends downwardly behind the truck wheels (not shown).

Figure 3:
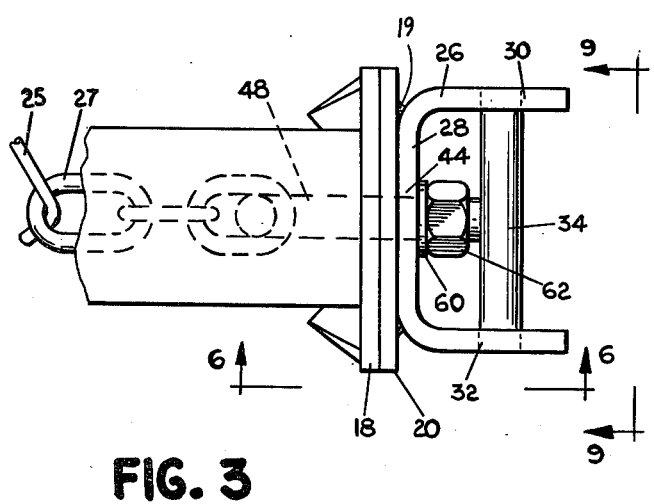
FIG. 3 is a fragmentary plan view of the second bracket member mounted to the mud flap assembly as shown in FIG. 2.
Figure 6:
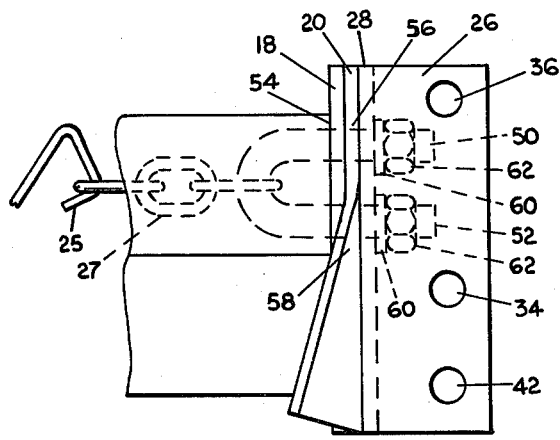
FIG. 6 is a side elevational view taken along the lines 6—6 in FIG. 3.
Figure 9:
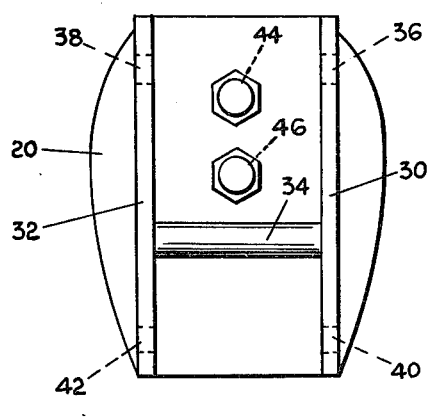
FIG. 9 is an end elevational view taken along the lines 9—9 in FIG. 3.

Referring now to FIGS. 3, 6, and 9, a U-shaped bracket member 26 has a central plate portion 28 and two flange sections or legs 30 and 32. The legs 30 and 32 are substantially parallel to each other and have vertical heights substantially equal to the seat member 20.

Approximately at the mid section thereof, a rod 34 extends between the two legs 30 and 32 and is securely fastened at its ends to the respective legs 30 and 32. Near the top of each leg 30 and 32 are aligned apertures 36 and 38. At the bottom portions of the legs 30 and 32 is a second set of aligned apertures 40 and 42 through legs 30 and 32, respectively.

The plate section 28 has two apertures 44 and 46 therethrough. A U-bolt 48 has two threaded legs 50 and 52 which extend through a central open area 54 in face plate 18, two apertures 56 and 58 in seat member 20 and apertures 44 and 46 in the plate section 28. Washers 60 and threaded nuts 62 fit onto legs 50 and 52. The chain 27 is also attached to the U-bolt 48 to hold the face plate 18, the seating member 20 and the bracket 26 together. Desirably, the seat member 20 is fastened to the bracket 26 through a weld 19 to permit the face plate 18 to rotate on the seat 20.

Figure 4:
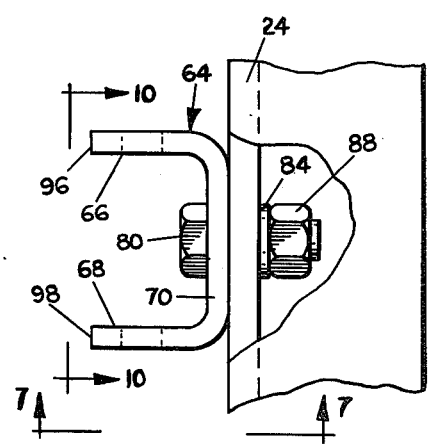
FIG. 4 is a plan view of a first bracket member of the frame as shown in FIG. 2.
Figure 7:
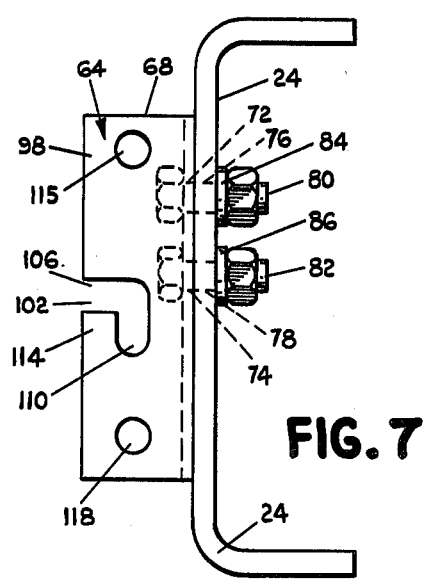
FIG. 7 is a side elevational view taken along the lines 7—7 in FIG. 4.
Figure 10:
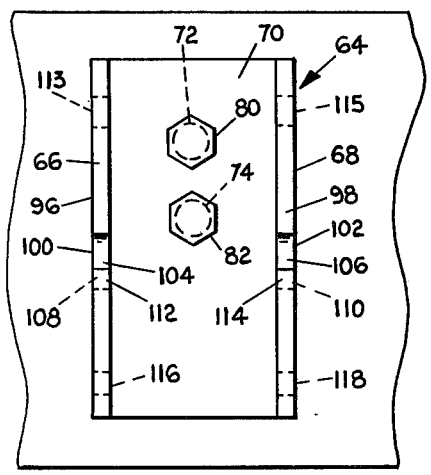
FIG. 10 is an end elevational view taken along the lines 10—10 in FIG. 4.

Referring now to FIGS. 4, 7, and 10, a U-shaped bracket member 64 has two legs 66 and 68 and a central plate section 70 spanning between the two legs 66 and 68. The bracket member 64 has a height substantially the same as bracket member 26.

Each leg 66 and 68 also has an aligned top aperture 113 and 115, respectively. A bottom portion of each leg 66 and 68 has aligned bottom apertures 116 and 118, respectively.

The plate section 70 has apertures 72 and 74 therethrough which are aligned with holes 76 and 78 in frame 24. A threaded fastener 80 extends through the hole 72 and 76 and threaded fastener 82 extends through hole 74 and 78. Washers 84 and 86 and nuts 88 and 90 engage fasteners 80 and 82 to secure the bracket member 64 against frame 24. Each leg 68 and 66 has extending from its outer edges 96 and 98, respectively, slots 100 and 102. The slots have horizontal sections 104 and 106 and downward extending ends 108 and 110, respectively. Between the downward ends 108 and 110 and outer edges 96 and 98 are retaining lips 112 and 114, respectively.

Figure 5:
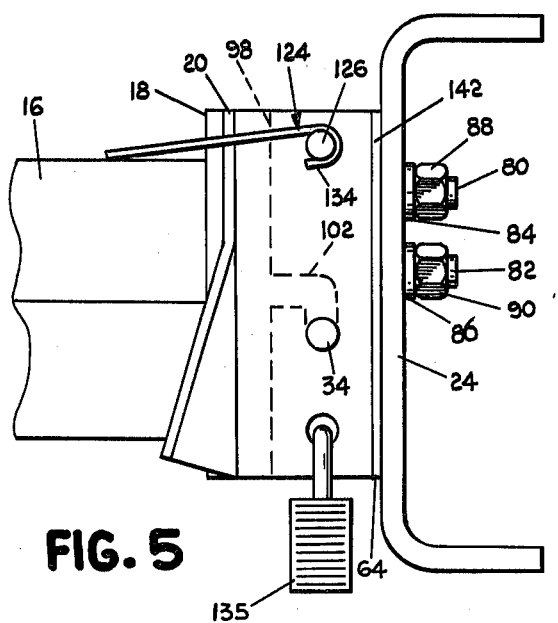
FIG. 5 is a side elevational view taken along the lines 5—5 of FIG. 2.

The slots 100 and 102 are sized to receive the rod 34 therein such that the rod 34 will fit through the horizontal sections 104 and 106 and slide down into the downwardly extending ends 108 and 110 as shown in FIG. 5.

Referring now to FIG. 2, the legs 30 and 32 of bracket member 26 are spaced from each other such that the inside surface 117 of leg 30 abuts the outside surface 120 of leg 66 and the inside surface 119 of leg 32 abuts the outside surface 122 of leg 68 when the rod 34 engages slots 100 and 102. Also, as shown in FIGS. 2 and 5, the extending edges 140 and 142 of legs 30 and 32, respectively, are in close proximity to frame 24 such that when the brackets 26 and 64 are coupled that any pivotal movement of bracket 26 with respect to bracket 64 is slight before the edges 140 and 142 abut the frame 24. Furthermore, the outer ends 96 and 98 of legs 66 and 68, respectively, are in close proximity to central plate section 28 when the brackets 26 and 64 are coupled.

Referring back to FIG. 5, when the rod 34 engages the inner ends 108 and 110 of the slots 100 and 102, the apertures 113 and 115 align with apertures 36 and 38. In addition, apertures 116 and 118 align with apertures 40 and 42.

Figure 8:
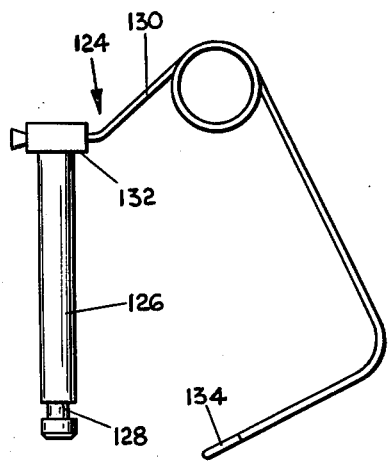
FIG. 8 is a plan view of the lock pin shown in FIG. 2.

A lock pin 124 as shown in FIG. 8 has a bar member 126 with a recess groove 128 at one end. A spring retainer 130 is connected to end 132 by bar member 126 and extends around to a hooked end 134. The spring retainer 130 is flexible such that hook end 134 can engage recess groove 128 and be secured thereto. The bar member 126 extends through aligned apertures 113, 38, 115 and 36 and recessed groove 128 engages hooked end 134 such that the lock pin 124 is retained in its engaged position with the bracket mount 22 and locks the bracket members 26 and 64 in a coupled position.

In addition, a padlock 135, shown in FIG. 1, can extend through the bottom apertures 116 and 118, 40 and 42 to prevent theft of the mud flap assembly.

In operation, one mounts a mud flap assembly equipped with bracket 26 to a bracket 64 extending from the frame 24 by sliding the two brackets 26 and 64 together such that the rod 34 engages slot 102 and 100. The extending edges 96 and 98 abut plate 28 and extending edges 140 and 142 abut frame 24 to limit the pivotal movement of the brackets. The bracket members are then positioned so top apertures 36, 38, 113 and 115 are aligned. The bar member of lock pin 124 is then moved through the top apertures of each bracket to lock the mud flap assembly in place with respect to frame 24. If so desired, a padlock 135 can also be extended through the aligned bottom apertures for locking the mud flap assembly against any possible theft from the frame 24.

For removal, the lock pin and padlock are merely removed and the mud flap assembly is lifted out so that the bracket 26 becomes disengaged from bracket 64. The mud flap assembly can then be easily transported to inside a shop where the mud flap can be replaced or any other parts of the mud flap can be repaired. It can also be relocated to a second desired location on the frame 24 by having another bracket 64 mounted in a second location.

In this fashion, a bracket mount provides for easy means to mount and remove mud flap assemblies without the need of threaded fasteners which can get easily clogged with mud and dirt to impair easy removing of the mud flap assembly. In addition, the mud flap assembly can be removed without releasing the tension spring 25 from arm 16 or from the chain which is attached to seat member 20. The bracket mount 22 is an economical and convenient mount which does not interfere with the pivotable action of the arm and face plate.

Reasonable variation and modification are possible within the scope of the foregoing disclosure, drawings, and appended claims without departing from the spirit of the invention.

The embodiments of the invention in which an exclusive property of privilege is claimed are as follows:

1. In a mud flap assembly for mounting a mud flap onto a motor vehicle frame, the mud flap assembly having a seat member, a face plate rotatably seated against the seat member, an arm attached at one end thereof to the face plate, and extending outwardly therefrom, a resilient tensioning means connecting the seat member and arm for retaining the face plate seated against the seat member, and a mud flap extending down along the arm, the improvement comprising:
   a first bracket member with substantially parallel flanges fixedly mountable to the frame of the vehicle;
   a second bracket member with substantially parallel flanges fixedly mountable to the seat member; and
   a hitch means for interlocking the first and second bracket members together so that the arm extends horizontally outward from the vehicle frame, and the mud flap assembly is removable from the frame as an assembled structure;
   the hitch means including a slot means in each parallel flange of one of the first and second bracket members and a rigidly connected projection extending between each parallel flange in the other of the first and second bracket members, the projection and slot means sized such that the slot means receives the projection; and
   a retainer means for retaining the projection within the slot means;
   the slot means includes a slot in each flange;
   the flanges of each bracket member are spaced apart such that when the projection engages the slots, the flanges of one bracket member abuts the flanges of the other bracket member along facing surfaces of the flanges.

2. A mud flap assembly as defined in claim 1 wherein the projection comprises a rod, the rod is positioned between the two flanges of the other bracket member, and the ends of the rod are connected to the two flanges.

3. A mud flap assembly as defined in claim 2 wherein each bracket member is substantially U-shaped, a portion of the first bracket member is adapted to abut the vehicular frame and be fixed thereto, a portion of the second bracket member is adapted to abut a face of the seat member opposite the portion of the seat member which is seated against the face plate.

4. A mud flap assembly as defined in claim 1 wherein:
   the slots are defined in the first bracket member;
   the projection is rigidly connected to the second bracket member;
   the slots extend inwardly and then downwardly from an outer edge of each flange;
   the retainer means comprises a lip defined in the flange between a downwardly extending inner end of the slot and the outer edge of the flange.

5. A mud flap assembly as defined in claim 4 wherein each flange has an aperture therethrough, the apertures are positioned such that one aperture through the flange of the first bracket member is alignable with an aperture through an abutting flange of the second bracket member, and further comprising a lock pin sized to extend through the apertures for locking the bracket members in a coupled position.

6. A mud flap assembly as defined in claim 5 wherein each flange has an outer edge, the outer edge of the flanges of the second bracket member being positionable in close proximity to the frame and moveable to abut the frame for limiting the pivotable movement of the second bracket member with respect to the first bracket member when the projection engages the slots but when the lock pin is disengaged from the bracket members.

7. A mud flap assembly for mounting a mud flap on a motor vehicle frame, the mud flap assembly having a seat member, a face plate rotatably seated against the seat member, an arm attached at one end thereof to the face plate, and extending outwardly therefrom, a resilient tensioning means connecting the seat member and arm for retaining the face plate seated against the seat member, and a mud flap extending down along the arm, the improvement comprising:
   a first U-shaped bracket having two legs and a bight section therebetween, the two legs transversely extending from the bight portion of the bracket;
   the bight section of the first bracket having apertures therethrough for receiving a fastener therethrough;
   the bight section of the first bracket adapted to abut the vehicle frame;
   a second U-shaped bracket having two legs and a bight section therebetween, the two legs transversely extending from the bight section of the second bracket;
   means for securing the bight section of the second bracket to the seat member;
   means for securing the bight section of the first bracket to the frame;
   each leg of the first bracket having a slot extending inwardly and then downwardly from outer edges of the legs;
   a rod extending between and connected to the two legs of the second bracket;
   the slots and rod being sized so the rod snugly fits within the slots;
   the leg portions of the two brackets being spaced apart such that the legs of the second bracket abut the legs of the first bracket at facing surfaces thereof when the rod is engaged in the slots;
   apertures through each leg of both brackets being positioned to be aligned when the first bracket is coupled to the second bracket;
   a lock pin extending through the apertures in the legs to lock the second bracket and first bracket together, the brackets being releasably secured together to facilitate replacement of the mud flap.

* * * * *